United States Patent [19]
Lin et al.

[11] Patent Number: 5,528,235
[45] Date of Patent: Jun. 18, 1996

[54] MULTI-STATUS MULTI-FUNCTION DATA PROCESSING KEY AND KEY ARRAY

[75] Inventors: Edward Lin, 556 Roxbury Ave. NW., Massillon, Ohio 44646-3281; Wallace Lin, Sunnyvale, Calif.

[73] Assignee: Edward D. Lin, Massillon, Ohio

[21] Appl. No.: 753,728

[22] Filed: Sep. 3, 1991

[51] Int. Cl.⁶ ............................................. G06F 3/02
[52] U.S. Cl. ..................... 341/22; 341/23; 379/369
[58] Field of Search ............................. 341/22, 23, 28, 341/20; 200/5 R, 5 A, 6 R; 400/479, 485, 490, 491.2, 493, 494, 495, 495.1; 379/36 B; 364/709.01, 709.08, 709.12, 709.15

[56] References Cited

U.S. PATENT DOCUMENTS

| | | | |
|---|---|---|---|
| 4,029,915 | 6/1977 | Ojima | 200/5 A |
| 4,449,839 | 5/1984 | Blever | 400/485 |
| 4,795,862 | 1/1989 | Linden | 200/5 R |
| 4,896,003 | 1/1990 | Hsieh | 200/5 A |

FOREIGN PATENT DOCUMENTS

| | | | |
|---|---|---|---|
| 60-107124 | 6/1985 | Japan | 341/23 |
| 60-231253 | 12/1992 | Japan . | |

OTHER PUBLICATIONS

Truelson; IBM Technical Disclosure Bulletin; vol. 26, No. 7B Dec. 1983, pp. 3746–3747.
IBM Technical Disclosure Bulletin; vol. 27, No. 10A, Mar. 1985, Compact Computer Keyboard.

Primary Examiner—Michael Horabik
Attorney, Agent, or Firm—Renner, Kenner, Greive, Bobak, Taylor & Weber

[57] ABSTRACT

Multi-status data entry key and keyboard capable of a one-to-one correspondence between each key status and a pre-assigned signal or state, with the neutral position or status being one of the states. Each non-neutral key status is associated with a unique pre-determined signal and corresponds uniquely to a specific symbol function or operation. The implementation of this keypad in telephones, computers, cash registers and other devices is shown. Its implementation in telephones is extensively covered.

8 Claims, 6 Drawing Sheets

MULTI-STATUS MULTI-FUNCTION DATA PROCESSING KEY AND KEY ARRAY

BACKGROUND OF INVENTION

1. Field of Invention

The present invention relates to keys and keyboards for data entry and device control.

2. Description of Prior Art

Increasingly higher-density integrated circuits enable computers and other electronic devices o be continuingly reduced in size. Although conventional data entry devices such as keys and keyboards can be scaled down in physical dimensions, a high practical limit to such reduction is imposed by their design and construction. For customary alphanumeric data entry in the English-speaking world, in addition to the usual 10 numerals, there needs to be included the 26 alphabets plus a certain number of punctuation and functional keys. The assignment of every such alphabet, numeral or function to a unique key results in a relatively large conventional computer keyboard. The use of much smaller keys to significantly reduce the size of conventional keyboard would only make the keyboard difficult to use and error-prone. This problem represents a major obstacle to continued miniaturization of electronic goods that use conventional keyboards.

Prior art teaches multiple schemes that attempt to address this problem. For instance, in the conventional touch tone telephone, alphabets and numerals are assigned within twelve keys. Each key carries up to three alphabets and a numeral. To distinguishably identify a character or a numeral, an elaborate scheme needs to be used. One such scheme is disclosed in U.S. Pat. No. 4,918,721 to Hashimoto, Apr. 17, 1990. Another scheme is disclosed in U.S. Pat. No. 4,825,464 to Wen, Apr. 25, 1989.

In both the Hashimoto and Wen patents, a unique sequence of key strokes is required to identify a single alphabet. The disadvantages of those schemes are multifold. First, those schemes are difficult and time-consuming to learn and use since multiple cumbersome and error-prone steps are involved. Second, once those decoding schemes are learned, they need to be accurately memorized. Third, infrequent usage may pose recall difficulties Fourth, during an emergency, inability to accurately recall the stroke sequence for each alphabet will produce errors and delays that may cause grave consequences Finally there is no standard among the different schemes, which appear to be totally arbitrary. Not surprisingly, there is no general acceptance of any such schemes as a standard.

Disclosed in U.S. Pat. No. 4,065,650 to Lou, Dec. 27, 1977 is a keyboard design with a grouping of sideways-actuated keys for use in a calculator and does not allow alphabet entry.

Keyboards with multi-directional keys were taught in U.S. Pat. No. 4,769,516 to Allen, Sep. 6, 1988 and in U.S. Pat. No. 4,029,915 to Ojima, Jun. 14, 1977. In Allen's invention, each key can only generate up to 3 alphanumerics. The user needs to exercise his or her fingers in different directions, namely extending, flexing, or depressing vertically in order to actuate the key. Moreover, the internal construction of each key comprises quite a number of components and is relatively complicated. In Ojima's patent, multi-directional numeric and multi-function keys are implemented in a row to be used as a calculator keypad disposed on a pen.

Disclosed in U.S. Pat. No. 4,687,200 to Shirai, Aug. 18, 1987 is a multi-directional sustained-on switch for use in a game playing apparatus. There were no considerations for maximum compactness or functionality for use as an alphanumeric key, nor were there provisions for an optional downward compression, or for encoding to form symbols in the ASCII or other standard code.

Disclosed in U.S. Pat. No. 4,896,003 to Hsieh, Jan. 23, 1990 is a multi-position electrical switch, utilizing a cylindrical pushbutton actuating member, and designed to reduce friction and wear. Again, there were no considerations for maximum compactness or functionality for use as an alphanumeric key, nor were there provisions for an optional downward compression, or for encoding to form symbols in the ASCII or other standard code.

None of the aforementioned patents discloses a functional keyboard that is compact in size, would not cause overstriking of neighboring keys during data entry, and able to address all the alphanumerics plus special operation functions.

OBJECTS AND ADVANTAGES

The present invention comprises a special key and a keyboard comprising an array of such special keys that can bypass the shortcomings in the prior art. Specifically, an array of directionally tiltable, compressible or directable keys are embedded within a frame. Unlike keys in conventional keyboards, each key in the present invention can be movable or tiltable in a plurality of directions including an optional vertical direction and is capable of generating multiple, different, distinct and pre-determined signals which are then mapped to alphanumerics, symbols, functions and operations, typically in a unique one-to-one correspondence.

More than one alphanumeric character or function are assigned to each key. However, only one specific, distinct, pre-assigned character or function is associated with each distinct, predetermined directional actuation of the key. In one embodiment of this novel key, each tiltable direction, including a [n optional] vertical downward direction, is associated with a pre-assigned and unique signal. Each such signal can be encoded to correspond to an alphabet, a numeral or a special function or operation. With keyboards implemented in this manner, the number of physical keys can be sharply curtailed resulting in keyboards very compact in physical size, and yet without reduction in the key size itself or the amount of space surrounding each key. Implemented in this manner, the operator can easily perform data entry without overstriking the neighboring keys as commonly occurs with conventional keyboards using undersized or crowded keys.

In the instant invention, each key can address five alphanumerics or functions. Each directional contact can be distinctly actuated without risk of confusion. In addition to stroking in the vertical direction, the key can be tilted in four sideways directions, namely forward, backward, left, and right. Each sideways contact direction corresponds to the bridging of a switch on a circuit board underneath the key top and results in the selective generation of a specific, different distinct and pre-assigned signal corresponding to said direction which is associated uniquely with a symbol, function or operation. The optional vertical downstroke corresponds to simultaneous bridging of all four sideways contacts and is interpreted as a unique, specific, distinct fifth directional stroke that is also associated uniquely with a symbol, function or operation.

Decoding circuits on the circuit board generates a code upon closing of the switch(es). The code can be an ASCII or other standard code. When the key top is completely pressed downward, all four contacts underneath the key top are bridged in the circuit board. The decoding circuit can, if so designed or programmed, choose to interpret this as a fifth specific distinctive key stroke and if so generates a unique preassigned corresponding code accordingly. With each key able to address five alphanumerics, operations or functions, the number of keys in a conventional keyboard can theoretically be reduced by five times, without any sacrifice in functionality.

In one embodiment of the present invention, the keyboard is installed as the key panel of a telephone. There is no need for a memorized procedure to dial a string of alphabets. The scheme is straight forward, self-evident and direct.

In another embodiment of the present invention, the keyboard is implemented for use with a palm-size computer. The number of keys are reduced and each key can encode more than one alphanumeric characters or functions. Key dimensions need not suffer any reduction in size. The keys can be comfortably actuated by the user and there is no sacrificing in the number of functions compared to a conventional keyboard.

In yet another embodiment, the keyboard of the present invention is installed as a control panel for a cash register. With numerals, alphabets and extra functions all integrated together, all operations are available as "single-stroke" or "one-step" actuation, despite the sharp reduction in the number of keys. The capabilities of a cash register using such a keyboard are vastly increased.

Hence, it is the object of the present invention to provide a keyboard with a reduced number of keys but able to fully encode, in a simple, easy, straightforward manner, all the alphanumerics and operational functions as are normally available in a conventional keyboard.

It is another object of the present invention to have the keyboard reduced in size but without the need to reduce key size so that the operator can easily perform data entry without overstriking the adjacent keys as commonly occurs in crowded keyboards with undersized keys.

It is yet another object of the present invention to provide a keyboard with a reduced number of keys that nonetheless enables a full representation of alphanumerics and operational functions to be effected with ease, speed, accuracy and comfort, without the use of any multi-stroke memorization schemes.

It is still yet another object of the present invention to provide a keyboard which is small in overall size, simple in construction, low in manufacturing cost and reliable in function but preserves the convenience and utility of any conventional keyboard.

It is a further object of the present invention to provide a keyboard which is universally adaptable to various kinds of devices and instruments that require the use of keys for data entry or control.

These and other advantages, features and objects of the present invention will be apparent from the following description in conjunction with the drawings.

Figure 1:
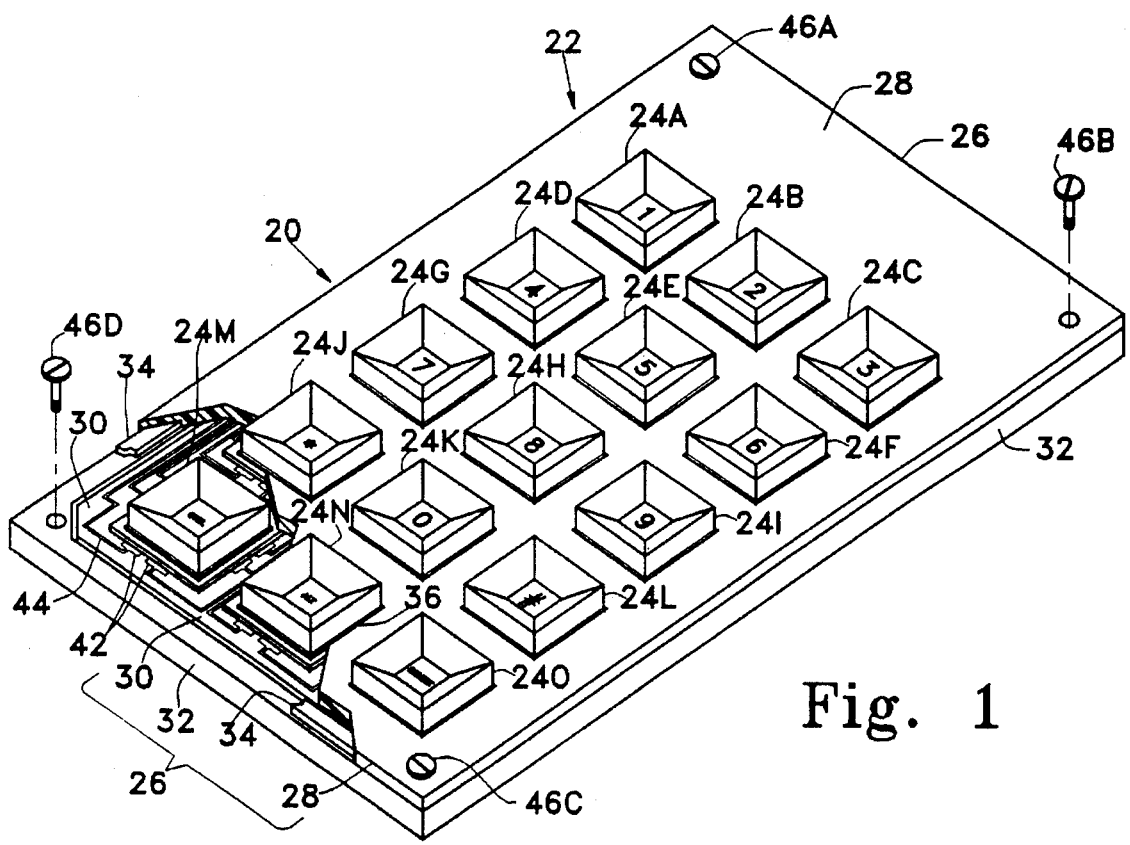
FIG. 1 is a cut-away isometric view of the preferred embodiment of the present invention illustrating the general structure of a telephone keyboard.

LIST OF REFERENCE NUMERALS 20 keyboard
22 key matrix
24 key
26 keyboard frame
28 keyboard face plate
30 circuit board
32 keyboard base
34 elastomer gasket
35 finger tip
36 openings in keyboard face plate
38 peripheral flange of key top
40 flange contact electrode
42 circuit board contact electrode
44 circuit traces
46 fastening device
48 key top
50 key facet
52 elastic leaf gasket around each key
54 resilient member
56 perimeter ridge on key top
58 center catch
62 advanced telephone key array
64 visual display means such as LCD
66 LED indicator light
68 compact computer keyboard
70 compact cash register keyboard

BEST MODE FOR CARRYING OUT THE INVENTION

Referring now to FIG. 1 which shows a cut-away isometric view of the preferred embodiment of the present invention, it will be seen that board is designated by reference numeral 20. An array of keys arranged in a matrix format in the preferred embodiment is designated by reference numeral 22. Key matrix 22 comprises a plurality of keys 24A to 24O. Keys 24A–24O are enclosed within frame 26 which consists of a circuit board 30, sandwiched between face plate 28 and base 32 and sealed with optional elastomer gasket 34. Face plate 28 has multiple openings 36 allowing keys 24A–24O to pass through and be accessible to the user. On the surface of circuit board 30 are contact electrodes 42 and circuit traces 44. Each actuation of any of the keys 24A to 24O would bridge a certain set of predetermined contact electrodes 42 and allow the passage of current through traces 44.

Decoding circuit identifies the sources of the specific current in each of traces 44 and generates electrical signals corresponding to each alphanumeric or function keystroke Notice that each of keys 24A to 24O is mechanically tiltable in several preselected directions. Each specific preselected contact position corresponds to a unique, distinct, predetermined signal of operation which is in turn decoded to a distinct, different, pre-assigned alphanumeric symbol or function. With this feature each key can generate 5 different distinct signals. The number of keys can therefore be reduced 5-fold compared to conventional keyboards.

Figure 2:
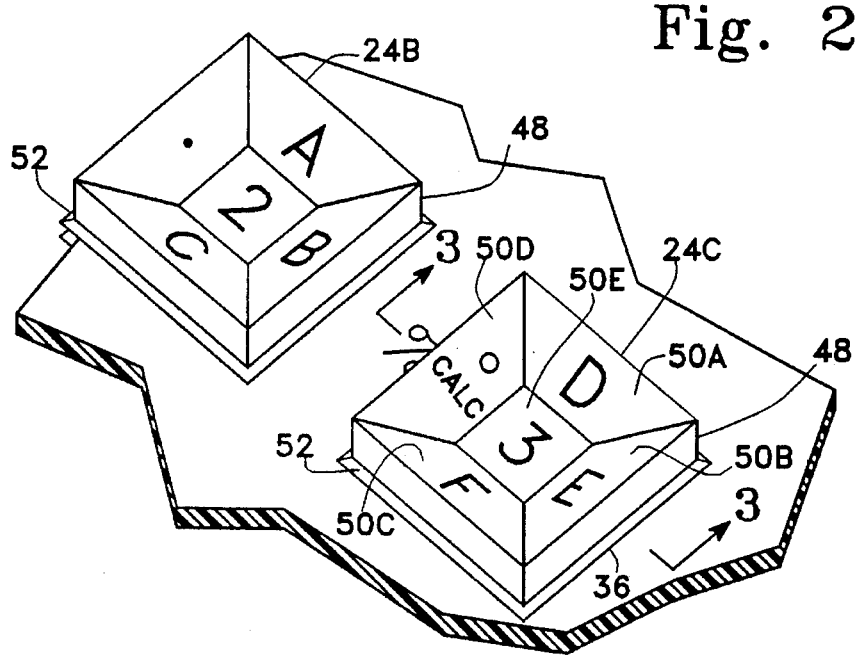
FIG. 2 is an enlarged isometric view of two concave keys from FIG. 1 showing specific alphanumeric or function assignment to each key facet.

FIG. 2 shows a closeup isometric view of the keys 24B and 24C in FIG. 1. Each key has a key top 48, each with a concave, 5-facet top: four slanted facets or areas 50A to 50D, labeled in a clockwise direction, and one flat central facet 50E. The concave contour enables comfortable fit of the user's finger tip and more importantly, precise control of directional movement of the key.

In this embodiment, each of keys 24A to 24O can be actuated in five positions when user's finger pressure is applied to each of the five key facets or areas 50A to 50E.

Optional elastic leaf gaskets 52 can cover the gaps between key tops 48 and the openings 36 within face plate 28. Elastic gaskets 52 prevent dust and moisture from entering the interior of keyboard 20 and assist the return to neutral key position after sideways actuation. As an alternative, the entire keyboard surface can be covered by a single elastomer membrane for even more effective shielding against dust and grime.

Figure 3:
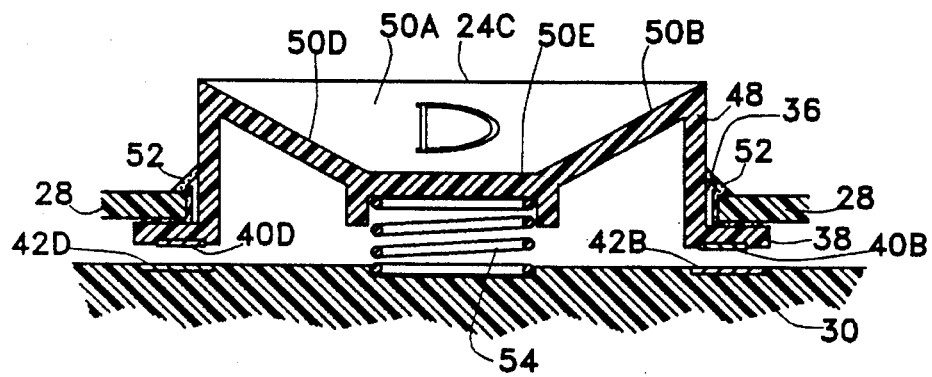
FIG. 3 is a cross-sectional view of the concave key taken along line 3—3 of FIG. 2 showing an example of its internal construction with the key in its non-contacted neutral position.

To clearer understand the operation of the directional keys 24A to 24O, refer now to FIG. 3, which is a cross-sectional view of key 24C taken along line 3—3 of FIG. 2. Key top 48 has four peripheral flanges 38. Centered on the bottom surface of each peripheral flange 38 is a contact electrode 40. Directly underneath each electrode 40 is a set of electrodes 42 printed on the surface of circuit board 30. Each set of electrodes 42 is split into halves as shown in FIG. 1. When a key stroke is actuated, flange electrode 40 is pressed down, thereby bridging the gap in circuit board electrodes 42, allowing current to pass through to decoding circuit for interpretation. Underneath the central facet 50E of key top 48 is a resilient member 54. In this embodiment, resilient member 54 is a coil spring. Other suitable substitutes may include an elastomer tube, cylinder or a pre-shaped piece of elastic material with recoil or springy properties.

Figure 4:
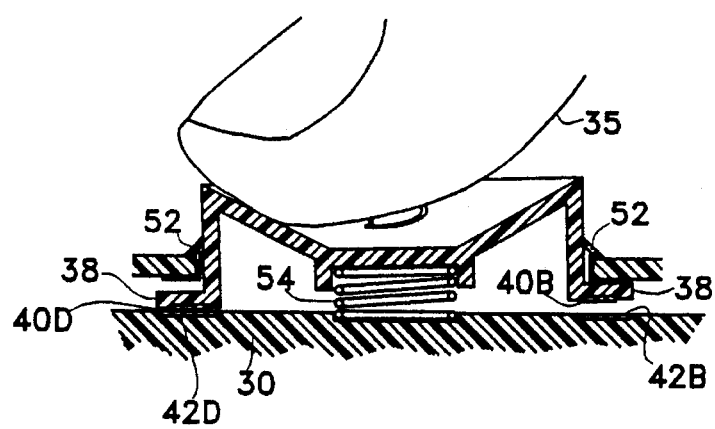
FIG. 4 shows a cross-sectional view of the concave key shown in FIG. 3 being pushed sideways into a preselected actuated contact position.

Notice that each of keys 24A to 24O has a neutral non-actuated position and 1 vertical and 4 sideways actuatable contact positions. Shown in FIG. 4 is the relative position of key top 48 in one of its actuated sideways contact positions, with one of its electrode 40D in contact with its corresponding electrodes 42D on circuit board 30. Each sideways actuated position corresponds to a specific, unique, pre-assigned alphanumeric symbol or function.

Figure 5:
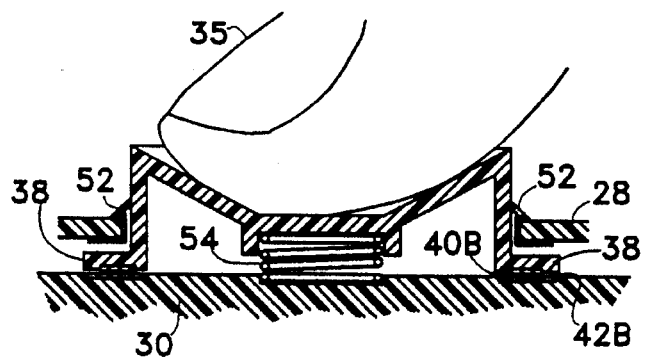
FIG. 5 shows another cross-sectional view of the concave key shown in FIG. 3 being pressed into yet another preselected actuated position with all the flange electrodes of the key top in full electrical contact with their corresponding electrodes on the circuit board, as actuated by the downward push of the user's finger tip.

Shown in FIG. 5 is an actuated vertical contact position with all four key flange electrodes 40A to 40D in full electrical contact with all four circuit board electrodes 42A to 42D on circuit board 30. In this instance, simultaneous engagement of all 4 sets of contacts produces a unique current flow pattern which is decoded as a specific, unique pre-assigned 5th function.

Any actuatable position including the two shown in FIG. 4 and FIG. 5 can be activated by a user's finger tip 35, or any slender object such as a pencil. Additionally, many variations of and additions to the design of the key top itself are possible. Two alternative embodiments are shown in FIG. 6.

For example, if it is desired to ensure that the key is accurately actuatable even by hard slippery objects such as a pen tip, the entire key can be made of non-slip elastomer material, and/or structural barriers to slippage in the form of a ridge 56 or center catch 58 can be integrated as part of the key design.

Figure 6:
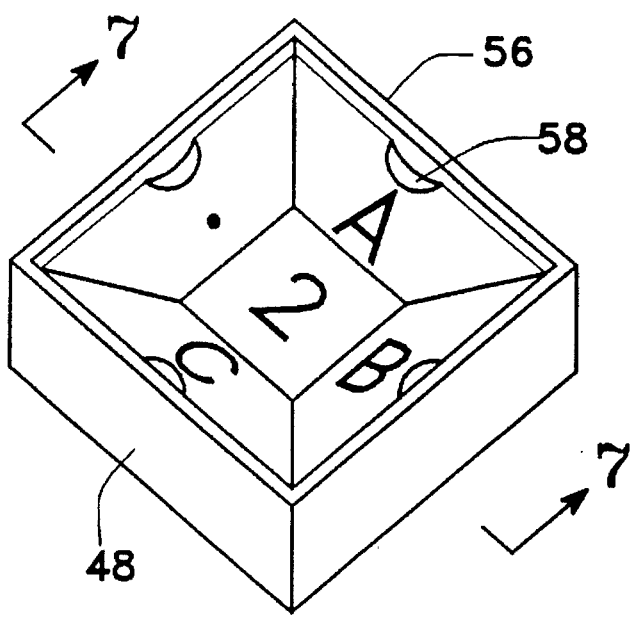
FIG. 6 is a perspective view of another embodiment of key design with optional anti-skid perimeter ridge and optional center catches.
Figure 7:
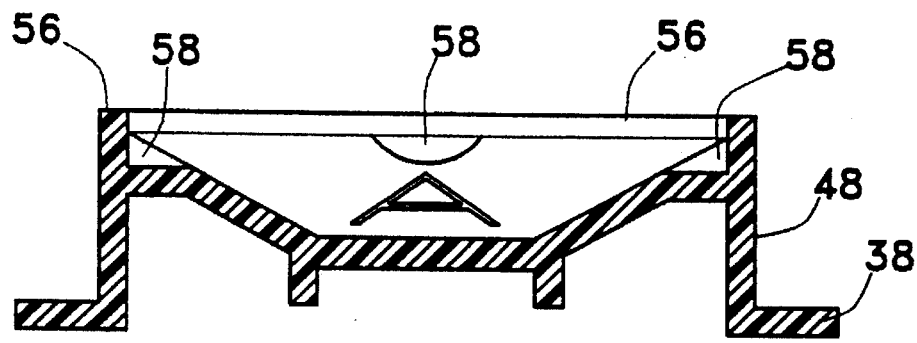
FIG. 7 is a cross section view of key top in FIG. 6 taken along the line 7—7.

FIG. 7 is a cross-sectional view of the key top in FIG. 6 taken along the line 6—6 to further illustrate the relationships of the perimeter ridge 56 and center catch 58 to the key facets. In other feasible embodiments, the key itself can be convex instead of concave and the direction of stroking or activation can be pulling instead of pushing. Such variations in implementation and embodiment will be readily apparent to those skilled in the art.

Figure 8:
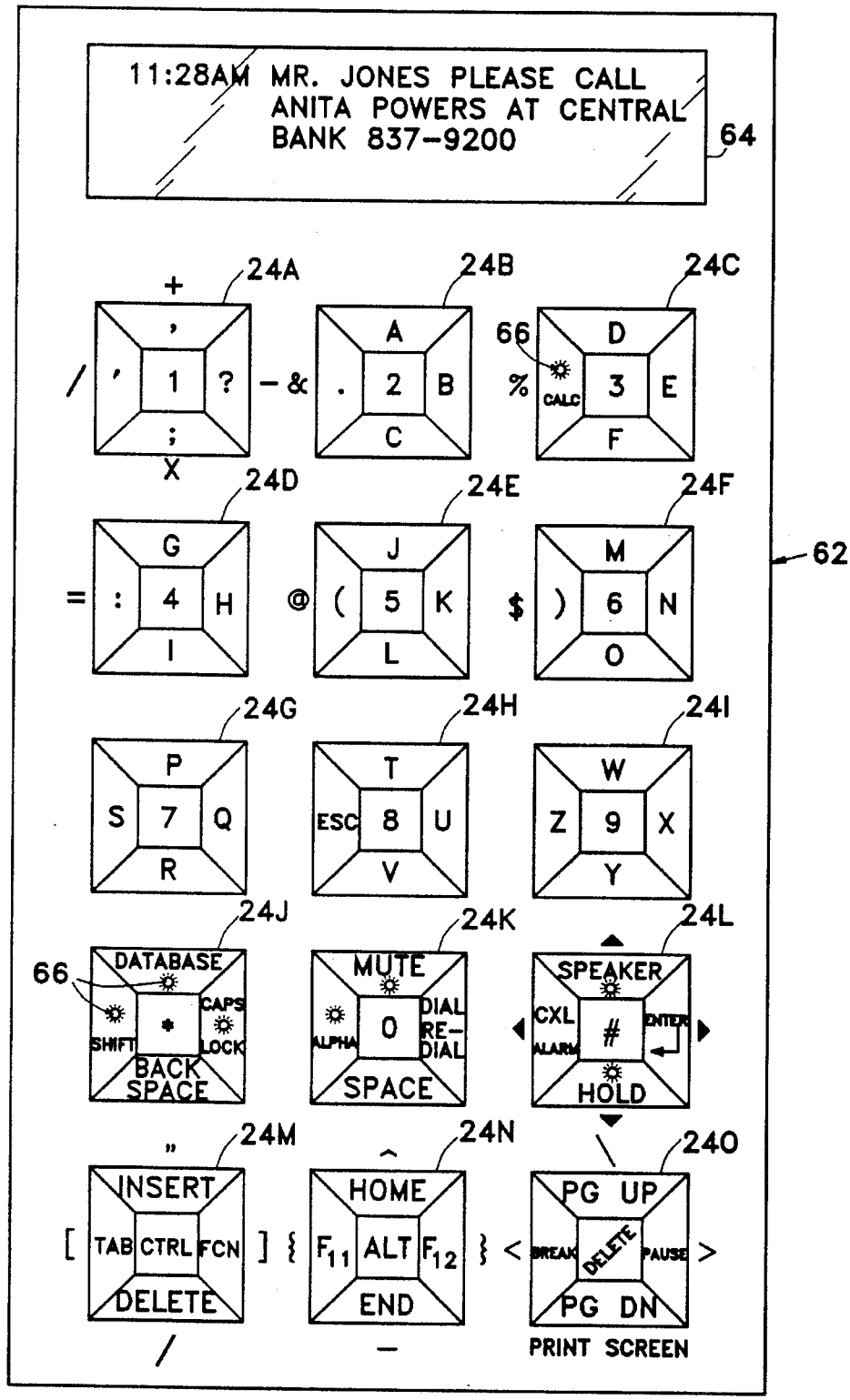
FIG. 8 shows the top view of the keyboard layout of the preferred embodiment of the present invention serving as an advanced telephone keypad.

FIG. 8 shows one embodiment of the present invention incorporated as an advanced telephone key array 62. As previously mentioned, there is absolutely no scheme of keystroke sequence to be memorized in the present invention. Alphanumeric entry by key is direct and self-evident. In addition to alphanumeric symbols traditionally found in phone keypads, keys 24A to 24I provide for previously missing letters Q and Z along with a full complement of punctuation symbols and calculator functions. The conventional pairing of alphabets to numeric symbols is also optionally preserved, allowing businesses to not only keep their unique phone numbers that spell pre-established messages (e.g. 1-800-FLOWERS) but also to create new ones as well, now with the inclusion of alphabets Q and Z (e.g. 1-800-FOR-QUIZ).

Keys 24J to 24O provide many more functions thus vastly expanding the capabilities of such telephone keypad. For example, by activating the DATABASE portion of key 24J, the keyboard can be placed in word processing mode capable of sending text messages through the phone lines. In order to maximize the new capabilities imparted to the standard telephone by this novel keypad, a visual display means 64 such as a LCD (Liquid Crystal Display) or TFT (Thin Film Transistor) panel may be deployed in conjunction with telephone key array 62.

Electronic telephone directory "Rolodex (trademark)"-like functions can readily be inputted into the telephone's memory either by direct entry or transfer via a link from another storage means such as a computer. Names and addresses may then be searched, scrolled and selected and a single key command, such as <Enter>, directs the phone to dial the selected party's number.

Reminders for appointments and other events can be entered into the telephone's memory and programmed to emit audio or visual signals as reminders at the appropriate time and on appropriate date. Each alphabet entry is a one-step operation in contrast to the conventional telephone keyboards where a memorized series of key strokes are needed to perform the conversion to alphabet and other functions. Other features such as converting to the speakerphone mode, when so equipped, can also be carried out easily by pushing the speaker facet of key 24L as shown in FIG. 8.

Computerized message deposit and retrieval systems such as voice mail can now be fully user capable when dealing with last names beginning with Q and Z. In addition, phones equipped with the new key pad and display means can serve as written message depositories as illustrated in FIG. 8. Call waiting features can attain special capability of silent display of flashing signs and alerts, and/or waiting caller's identity and message. Communication by the deaf or mute will be greatly eased and expanded without need for special expensive TDD equipment or operator assistance.

Many other functions and capabilities are made possible by this unique key and hence keypad. Briefly, and referring again to FIG. 8, by pushing the CALC facet of key 24C, for example, the calculator function is activated and a LED light 66 on the CALC facet lights up to confirm and remind that the phone is now in CALC mode. In this mode, the alphanumeric functions are temporarily disabled to permit quick calculation. Key facets with LED lights such as CALC, SHIFT, ALPHA, MUTE, etc. are toggle type switches which alternate between on and off states as they are repeatedly pressed. CAPS-LOCK facet permits continued alphabetic entry in capital letters. Depression of SHIFT key function on key 24J switches the side-facet punctuation functions of key 24A from ",", "?", ";" and """ to the calculator functions "+", "−", "×", "/" indicated around the key's perimeter.

Likewise, shift key in conjunction with key 24L would convert "Speaker", "Enter", "Hold" and "Cancel Alarm" functions to scrolling functions. The "Cancel Alarm" feature is to terminate or cancel alarm indicator when a preset reminder alarm time is reached and the LCD panel displays the purpose of the alarm or reminder. Other functions on the phone keypad are self-explanatory. Indeed, the coupling of a large LCD panel or TFT panel with an advanced keypad as disclosed in this invention renders an otherwise ordinary phone into a computer terminal with all its associated capabilities. The further addition of an autofocus video input means in conjunction with a TFT panel and optical fiber transmission will enable wide scale teleconferencing. These diverse enhanced capabilities of such an advanced telephone as discussed in the preceding paragraphs are the subject of a separate patent application.

Figure 9:
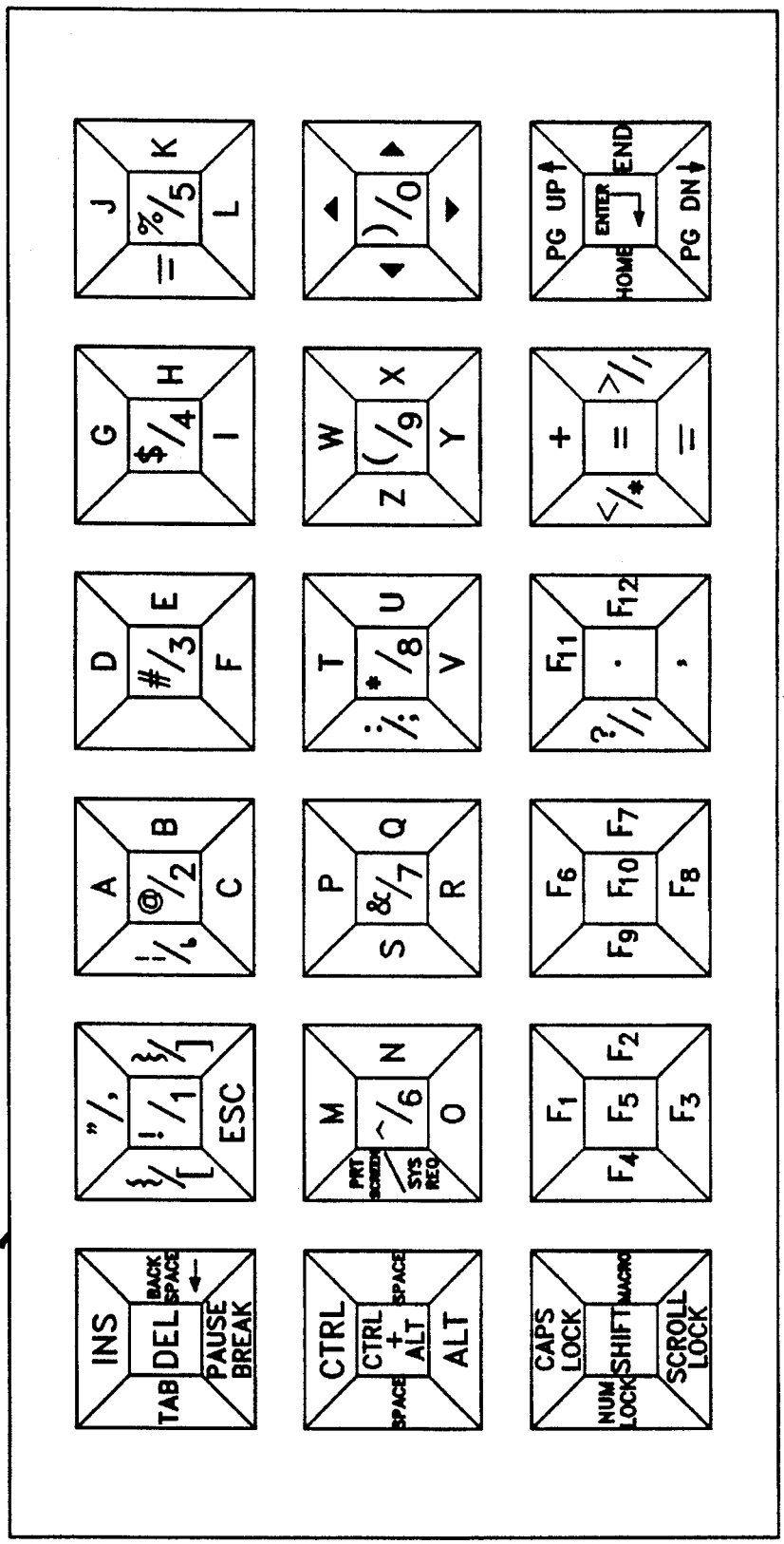
FIG. 9 shows the top view of the keyboard layout of another embodiment of the present invention serving as a computer keyboard.

FIG. 9 shows the key layout of a compact size computer keyboard 68. As is clearly shown, the number of keys is substantially decreased when compared to a conventional computer keyboard. The compact keyboard of the present invention is ideal for present day palm-size or pocket-size computers. The number of keys are reduced without necessitating a decrease in key size such that their operation can still be performed with ease and accuracy. Moreover, there is no sacrifice in the number of alphanumerics and functions. A logical alphabetical and clockwise designation of key facets or areas makes the use of said keyboard simple and easy.

Figure 10:
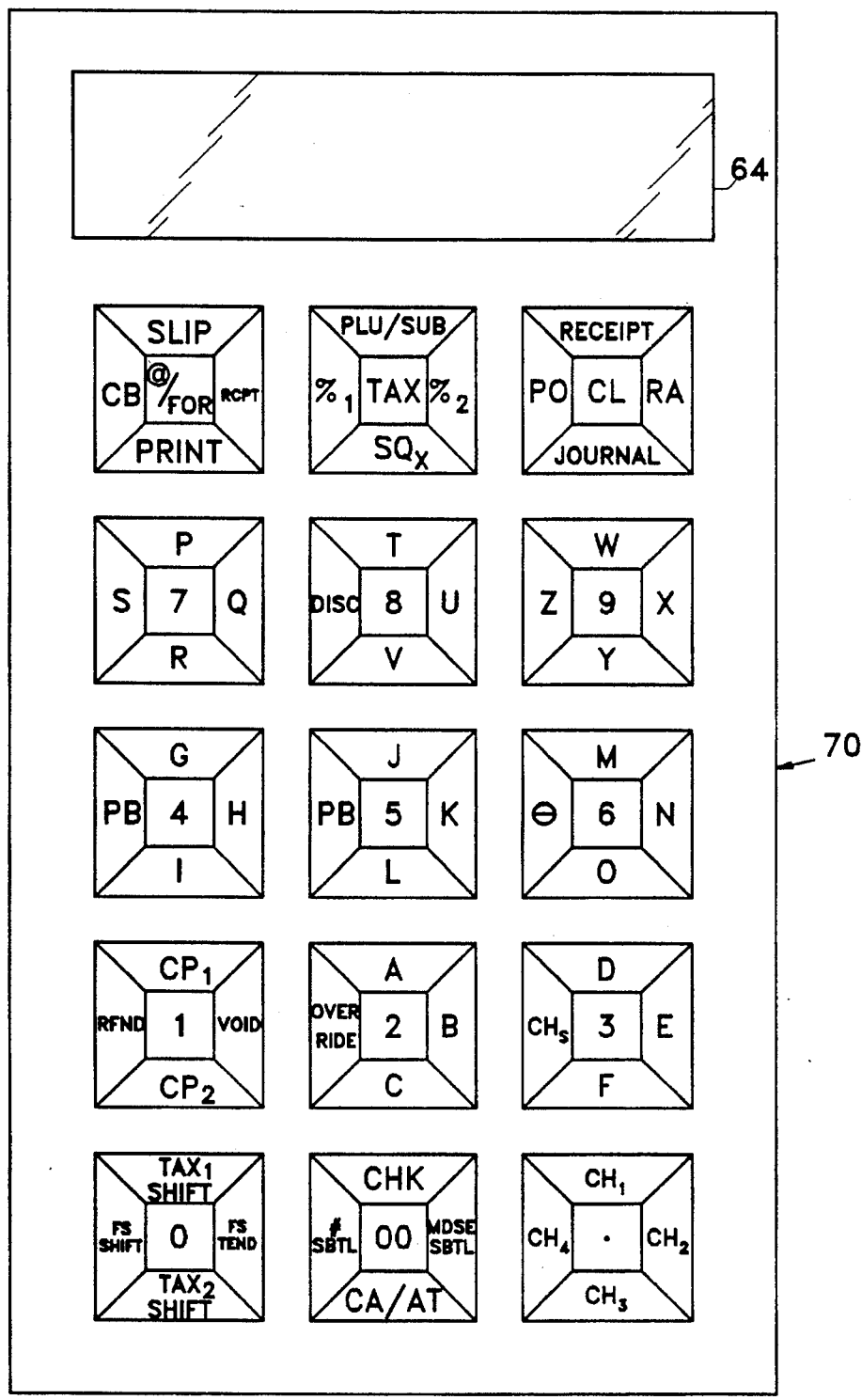
FIG. 10 shows the top view of the keyboard layout of yet another embodiment of the present invention serving as a compact key panel for a cash register.

FIG. 10 shows the layout of another embodiment of the present invention in the form of an electronic cash register keypad 70. In addition to the standard functions of a conventional electronic cash register, many more functions can be incorporated into relatively few keys. Furthermore, all operations can be implemented as a "single-stroke" execution without memorization. This feature substantially simplifies the operation of the cash register and opens up vastly more room for customized keypads and increased machine capabilities. In this illustrative embodiment, up to a five-fold reduction in the number of keys or a five-fold increase in functions and capabilities is possible.

CONCLUSION, RAMIFICATION AND SCOPE OF INVENTION

It is apparent from the foregoing detailed disclosure that this invention is a unique, highly versatile technological advancement providing for a multi-status key for data input, whereby each distinct pre-determined directional movement or status of key results in selective generation of specific, distinct, pre-assigned signal. Because each key is uniquely able to represent multiple functions, it provides a new level of simplicity, expanded capabilities and miniaturization not previously possible.

Because limitation in keyboard miniaturization is commonly viewed as the major obstacle to continued miniaturization of devices such as portable telephones, computers and other devices requiring data processing via keys, the present invention represents an important technological advancement and answers a long-felt and pressing need.

In addition to its important application in telephones and computerized business machines, many other applications are feasible within the scope of the invention. For example, the present invention can be used as a control keypad for a variety of household appliances such as master remote control device for integrated audio-video entertainment, microwave oven, security alarm panel and the like.

It is also apparent that the present invention can be used as a human-machine interface for a variety of industrial instruments and equipment such as bar-code inventory control apparatuses or robotic controls.

It is also anticipated by this invention that the keyboards or keypads need not be restricted to compact or scaled down version of the conventional counterparts. For example, the present invention can well be implemented as a full-sized conventional computer keyboard but with substantially more functional keys incorporated.

Alternatively, the present invention can be modified as a data entry device to computers, word processors or even telephones for some languages such as Chinese or Japanese where a large number of keys may otherwise be required.

Lastly, the designs of the key(s) and/or keypad can be modified as desired. For example the key top can be convex instead of concave, can have a plurality of sides other than four, and can be actuated by pulling instead of pushing and sliding instead of tilting. Likewise, the sensing means for detecting the actuation of each key facet can be an electric, mechanical, electromechanical, piezoelectric, voltage-change or capacitance change sensor, to name just a few alternatives. Furthermore, indicator means to inform, indicate to or alert a user of, and to confirm, the activation of a particular symbol, function or operation just selected, or the mode or status under which the user is operating can also be accomplished by various means, including the use of lights, sounds and tactile feedback.

The simultaneous actuation of all contacts of each key, such as the downward stroke in the illustrated embodiment, is an optional feature or status, which need not, although may if desired, correspond to any symbol, function or operation.

The present invention may be applied to any data input/output device where an increase in the key's functionality or a reduction in the number of keys is advantageous. Thus the invention may be readily applied to control panels of various household appliances such as telephones, consumer goods such as camcorders, and various other gadgets such as TV remote controls, all of which use input keys or buttons or their equivalents, which are amenable to substitution by the present invention to achieve an increase of functionality and/or a decrease in the number of keys while reducing the size of the control panel.

Nor is the present invention limited in its application to the details of the construction and to the arrangements of the components set forth in this disclosure or illustrated in the drawings, as the present invention is capable of other embodiments and of being practiced and carried out in various ways. It is to be understood that the phraseology and terminology employed herein are for the purpose of description and should not be regarded as limiting. Those skilled in the art will appreciate that the conception of this invention may readily utilized as a basis for the designing of other structures, methods and systems for carrying out the several purposes of the present invention.

Even though numerous characteristics and advantages of the present invention have been described and set forth herein, together with details relating to the structure and function of the invention, the disclosure herein is illustrative only. It will be readily understood by those skilled in the art that changes may be made in form and detail, especially in matters of shape, size and arrangement of parts and the use of functional equivalents and substitutes, within the principles of the invention and to the full extent indicated by the broad general meaning of the terms in which the claims are expressed.

It is important therefore, that the claims be regarded as including such equivalent approaches and constructions insofar as they do not depart from the spirit and scope of the present invention.

We claim:

1. An alpha-numeric keyboard, comprising:
   an array of at least ten multi-status keys, each of said keys having a digit of 0 through 9 uniquely associated therewith, six of said keys having three different letters uniquely associated therewith and two of said keys having four different letters uniquely associated therewith, there being eight keys having letters associated therewith, said eight keys having associated letters accommodating all twenty-six letters of the alphabet, wherein one of said two keys having four letters associated therewith has the number 7 associated therewith and the other of said two keys having four letters associated therewith has the number 9 associated therewith, and further wherein said two keys having the digits 0 and 1 associated therewith have no alphabetic letters associated therewith, but have punctuational, calculation and telephonic functions associated therewith, and further comprising a circuit board, and wherein certain of said multi-status keys comprise:
   a key top member having n facets;
   a resilient member extending from said circuit board and connected to a bottom of said key top member, said resilient member accommodating movement of said key top member under operator control and biasing said key top member to a neutral position;
   n−1 key contacts connected to and positioned about a bottom surface of said key top; and
   n−1 board contacts connected to the circuit board, one of each of said key contacts being uniquely associated and in juxtaposition with one of said board contacts, wherein each of n−1 of said facets is uniquely associated with one of said key contacts and one of said board contacts, and wherein one of said facets, exclusive of said n−1 of said facets, is associated with all of said key contacts and said board contacts.

2. The alpha-numeric keyboard according to claim 1, wherein said resilient member comprises a spring.

3. The alpha-numeric keyboard according to claim 1, wherein movement of said key top member upon said resilient member obtains engagement of selected ones of uniquely associated key contacts and board contacts.

4. The alpha-numeric keyboard according to claim 3, wherein said movement of said key top member upon said resilient member further attains simultaneous engagement of each of said uniquely associated key contacts and board contacts.

5. A multi-status key for data or signal input to a circuit board, comprising:
   a key top member having n facets;
   a resilient member extending from said key top member, said resilient member accommodating movement of said key top member under operator control and biasing said key top member to a neutral position;
   n−1 key contacts connected to and positioned about a bottom surface of said key top; and
   n−1 board contacts connected to the circuit board, each of said key contacts being uniquely associated and in juxtaposition with one of said board contacts, each of n−1 of said facets being uniquely associated with one of said key contacts and one of said board contacts, and wherein one of said facets, exclusive of said n−1 of said facets, is associated with the totality of said key contacts and said board contacts.

6. The multi-status key according to claim 5, wherein said resilient member comprises a spring.

7. The multi-status key according to claim 5, wherein movement of said key top member upon said resilient member attains engagement of selected ones of said uniquely associated key contacts and board contacts.

8. The multi-status key according to claim 7, wherein said movement of said key top member upon said resilient member further attains simultaneous engagement of each of said uniquely associated key contacts and board contacts.

* * * * *